US011425010B2

(12) United States Patent
Kwok et al.

(10) Patent No.: US 11,425,010 B2
(45) Date of Patent: Aug. 23, 2022

(54) ENHANCED SIGNAL STRENGTH INDICATOR (71) Applicant: T-Mobile USA, Inc., Bellevue, WA (US)

(72) Inventors: Ming Shan Kwok, Seattle, WA (US); Gina Tran, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 297 days.

(21) Appl. No.: 16/201,130

(22) Filed: Nov. 27, 2018

(65) Prior Publication Data
US 2020/0169486 A1 May 28, 2020

(51) Int. Cl.
H04B 17/318 (2015.01)
H04L 43/08 (2022.01)

(52) U.S. Cl.
CPC ........... H04L 43/08 (2013.01); H04B 17/318 (2015.01)

(58) Field of Classification Search
CPC ....... H04L 43/08; H04B 17/318; H04B 17/29; H04B 17/23
See application file for complete search history.

(56) References Cited

U.S. PATENT DOCUMENTS

| 9,277,472 B1* | 3/2016 | Price | H04W 48/18 |
| 2008/0188194 A1* | 8/2008 | Liu | H04B 17/309 |
| | | | 455/226.4 |
| 2009/0054074 A1* | 2/2009 | Aaron | H04L 43/045 |
| | | | 455/452.2 |
| 2010/0222081 A1* | 9/2010 | Ward | H04W 4/02 |
| | | | 455/456.3 |
| 2013/0121145 A1* | 5/2013 | Draznin | H04W 48/18 |
| | | | 370/230 |
| 2016/0112894 A1* | 4/2016 | Lau | H04B 17/318 |
| | | | 370/252 |
| 2017/0078964 A1* | 3/2017 | Siomina | H04W 72/0446 |
| 2018/0270677 A1* | 9/2018 | Brisebois | H04L 47/283 |
| 2019/0260639 A1* | 8/2019 | Balakrishnan | H04L 41/0823 |
| 2020/0092019 A1* | 3/2020 | Wang | H04W 4/33 |

* cited by examiner

Primary Examiner — Edan Orgad
Assistant Examiner — Malick A Sohrab
(74) Attorney, Agent, or Firm — Han Santos, PLLC (57) ABSTRACT Techniques are described herein for presenting signal strength indicators on a display screen of a user equipment based on various telecommunications signals and one or more types of user experience corresponding to network performance metrics in a target geolocation of a network. The signal strength indicia can include one or more sets of signal bars. The user equipment can be equipped to measure the signal strength received. Additionally, the user equipment can analyze network performance metrics such as packet latency, throughput, packet loss, and availability based on user experience. One or more user experience types can be selected in order to compute a value that is representative of the received signal strength and the user experience data. Signal strength indicators are displayed on the display screen of the user equipment based on the measured signal strength and user experience for different forms of communication such as voice, video, and data.

20 Claims, 4 Drawing Sheets

ENHANCED SIGNAL STRENGTH INDICATOR

BACKGROUND

Many mobile devices utilize a set of signal bars of increasing height to display the received signal strength from a cellular network. Traditionally, a set of signal bars comprise five bars, and these signal bars serve as a visual indicator to enable users to judge connectivity, which can depend on various factors such as proximity to a cell tower, nearby obstructions, network traffic, and/or so forth. While devices can display or illuminate more signal bars to indicate a stronger signal in certain areas, there is no standard measurement for representing signal strength or field strength. Additionally, the ways in which these signal bars reflect reception varies greatly between devices, as each manufacturer uses a different algorithm to represent signal strength. In some cases, the representation of the signal bars can also vary between devices even from the same manufacturer. Additionally, signal indicator values may vary according to telecommunications service providers.

Moreover, in areas where signal reception would normally be strong, the signal bars would generally indicate, display, or illuminate all five bars. However, the signal bars are not depictive of various factors that can have an effect on reception or that may cause complete failure due to radio frequency (RF) interference. For instance, mobile devices located inside a building with thick walls or underground areas can lack reception unless they are wired for cell signals. Accordingly, it is impossible to read objective signal data from the signal bars in a reliable and meaningful manner.

BRIEF DESCRIPTION OF THE DRAWINGS

The detailed description is described with reference to the accompanying figures, in which the leftmost digit(s) of a reference number identifies the figure in which the reference number first appears. The use of the same reference numbers in different figures indicates similar or identical items.

DETAILED DESCRIPTION

This disclosure is directed to techniques for presenting signal strength indicators on a display screen of a user equipment (UE) based on various telecommunications signals and user experience data. The signal strength indicia can comprise one or more sets of signal bars, dots, or other symbols. In various embodiments, one or more user equipment can be equipped with a signal processor that is configured to measure the signal strength received from a nearby cell tower in a coverage area or zone. Additionally, the user equipment can implement various analysis techniques to analyze network performance metrics such as packet latency, throughput, packet loss, and availability based on user experience. One or more types of user experience can be selected via a selection module in order to compute a signal strength value that is proportional to the received signal strength and the user experience data that comprise corresponding network performance metrics. The signal strength value can be used to depict appropriate signal strength indicia. In various embodiments, the user experience data or metrics can be passed onto a server. The server can communicate with a data store, which can comprise a user profile and account related information.

Based on the signal strength and the user experience data for different forms of communication (e.g., voice, video, data, etc.), and various network considerations, claimed embodiments of the present invention may present signal strength indicators associated with each user experience (e.g., voice experience, video experience, data experience, etc.) on the display screen of the user equipment. Accordingly, the user equipment may have signal strength indicators that are presented for each of the voice experience, video experience, and data experience when telecommunications signals are available. The number of signal bars presented for each type of user experience may vary based at least partially on the signal strength of the telecommunications signals and the user experience data. For instance, a first set of signal bars representing voice experience may display more bars than a second set of signal bars representing experience when the user experience metrics for voice is greater than the user experience metrics for data. Additionally, or alternatively, the first, second, and third sets of signal bars can be consolidated or averaged such that the signal strength indicia can be presented as a single set of signal bars, thereby representing the user's overall experience. The techniques described herein may be implemented in a number of ways. Example implementations are provided below with reference to the following figures.

Example Network Architecture

Figure 1:
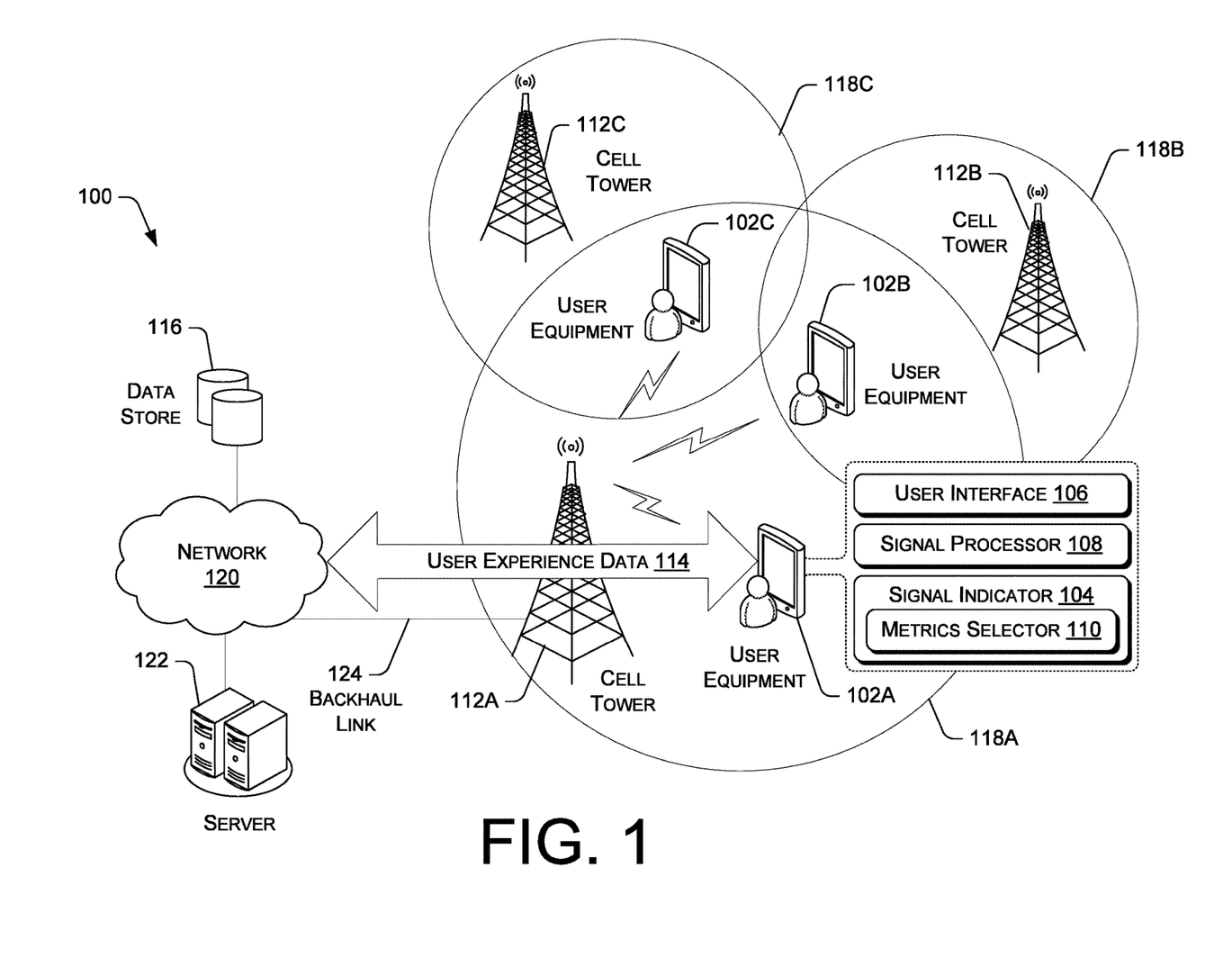
FIG. 1 illustrates example network architecture for determining signal strength using standardized measurements and user experience data.

FIG. 1 illustrates example architecture for determining signal strength using standardized measurements and user experience. The architecture comprises a system 100 including a plurality of user equipment 102A-102C. The user equipment 102A-102C comprises smartphones, mobile devices, personal digital assistants (PDAs), or other common wireless communication devices that are capable of receiving inputs, processing the inputs, and generating output data. The user equipment 102A-102C can also include a personal computer or workstation, a server device, a laptop, a tablet, a media-playing device, a portable gaming system, and/or so forth, depending upon embodiments. For example, a user may use the user equipment 102A-102C to make voice calls, send and receive text messages, and transmit digital media or digital content. One or more user equipment 102A-102C is connected to a network 120 (e.g., a core network) of a telecommunication network utilizing one or more cell towers 112A-112C, wireless base stations, or any other common wireless or wire line network access technologies. The core network can include a plurality of servers that implement network components (e.g., the Serving GPRS Support Node (SGSN) and the Gateway GPRS Support Node (GGSN)).

Each of the cell towers 112A-112C provides network coverage in target geolocations 118A-118C. Each of the cell towers 112A-112C can also connect to the network 120 via a backhaul link 124 or other distributed portions of the network 120. The backhaul link 124 may be configured to employ any common wire line communication technology, including but not limited to, optical fiber, coaxial cable, twisted pair cable, Ethernet cable, and power-line cable, along with any common wireless communication technology.

The network 120 as shown herein is intended to depict a simplified representation of a network that implements various types of technology as they become available. For example, the network 120 can be a cellular network that implements 2G, 3G, 4G, and long-term evolution (LTE), LTE advanced, high-speed data packet access (HSDPA), evolved high-speed packet access (HSPA+), universal mobile telecommunication system (UMTS), code-division multiple access (CDMA), global system for mobile communications (GSM), WiMax, and WiFi access technologies.

The user equipment 102A-102C is configured to provide a signal indicator 104 for displaying signal strength indicia on a user interface 106 (e.g., a display screen). The signal strength indicia can comprise one or more sets of signal bars of increasing height or dots to display the received signal strength from the network 120. For example, more signal bars can be displayed or illuminated to indicate a strong signal and fewer signal bars can be displayed or illuminated to indicate a weak signal. Additionally, the signal strength indicia can be configured to display signal strength for different types of user experiences. For example, the signal strength indicia can comprise a first set of bars for voice experience, a second set of bars for data experience, and a third set of bars for video experience. Each set of bars can display or illuminate a different number of signal bars. For instance, the first set of bars can illuminate four out of five bars and the second set of bars can illuminate two out of five bars. The signal strength indicia can be based at least partially on the signal strength detected and measured by the user equipment 102A-102C from the cell towers 112A-112C. Additionally, the signal strength indicia can be based at least partially on the user experience data obtained via the user equipment 102A-102C.

It is noted that the signal strength indicia indicates the strength of the signal from a particular network to which the user equipment 102A-102C is connected. For example, if the user equipment 102A-102C is using CDMA services, then the signal strength indicia indicates the strength of the CDMA signal. Similarly, if the user equipment is using a wireless local area network such as WiFi, the signal strength indicia indicate the strength of the WiFi signal. In various embodiments, a user may make the choice of services or technologies used. For example, the user can utilize a native application on the user equipment 102A-102C to configure user preferences and settings.

Additionally, the user equipment 102A-102C can measure signal strength using various techniques, depending on the network 120. For instance, user equipment 102A-102C in UMTS networks can use received signal code power (RSCP), user equipment 102A-102C in GSM networks can use received signal strength indicator (RSSI), and user equipment 102A-102C in LTE networks can utilize reference signal received power (RSRP). Signal strength and signal quality reflecting the RSCP, RSSI, or RSRP value can be measured in decibels (dBm).

The user equipment 102A-102C comprises a signal processor 108. The signal processor 108 can be coupled to a memory unit that includes appropriate processing modules to implement the appropriate physical layers and protocol stacks to enable signal processing. For example, the signal processor 108 can comprise digital signal processors or other types of processing units for determining the received signal strength (i.e., in dBm) from the cell towers 112A-112C. In various embodiments, the signal processor 108 can measure various components of signal strength such as the upload and download speeds of telecommunications signals.

The user equipment 102A-102C is further configured to collect user experience data 114 in each of the target geolocations 118A-118C to be receiving network coverage. The user experience data 114 can correspond a user's voice experience, video experience, data experience, and/or so forth. The user experience data 114 can correspond to one or more network performance metrics. Without limitation, the metrics comprise packet latency, throughput, packet loss, availability, and/or so forth. The user experience data 114 can comprise service quality data such as call failures, call drops, delay measurements, level measurements, email and Short Message Service (SMS) metrics, RSSI, RSCP, RSRP, and/or so forth.

In various embodiments, the user experience data obtained at the user equipment 102A-102C can be transmitted to a server 122 in communication with the network 120. The server 122 may include general-purpose computers, such as desktop computers, tablet computers, laptop computers, servers (e.g., on-premise servers), or other electronic devices that are capable of receiving inputs, processing the inputs, and generating output data. The server 122 may be operated by the telecommunications service provider or a third-party entity that is working with the telecommunications service provider.

The server 122 may store data such as user experience data 114 in a data store 116 or in other distributed storage systems. As servers can be readily added or removed, the server 122 can include a plurality of physical machines that may be grouped together and presented as a single computing system. Each physical machine of the plurality of physical machines may comprise a node in a cluster. The server 122 may also be in the form of virtual machines, such as virtual engines (VE) and virtual private servers (VPS). In various embodiments, the server 122 can implement network performance monitoring and analysis tools or performance managers. In this way, the server 122 can utilize user experience data 114 in order to analyze performance measures, mitigate or troubleshoot any identified problems, and/or so forth.

In various embodiments, the signal indicator 104 can implement a selection module such as a metrics selector 110 for selecting one or more network performance metrics and the user experience data 114 corresponding to each type of user experience. For example, the metric selector 110 can select user experience data 114 corresponding to packet latency and throughput for a user's data experience. In this way, the metrics selector 110 can obtain user experience data associated with specific network performance metrics for different types of user experiences. The metrics selector 110 can select one or more network performance metrics based on user input or user settings of the user equipment 102A-102C or based on communications received from the server 122. More specifically, the user equipment 102A-102C can receive a user input to display signal strength indicia for only data experience. Upon selecting one or more network performance metrics and user experience data 114 via the metrics selector 110, the signal indicator 104 can calculate a signal strength value based at least partially on the signal strength of a telecommunications signal and the user experience data corresponding to the type of user experience. The signal strength value can correspond to one or more signal strength indicia for display on the user equipment 102A-102C.

Example Computing Device Components

Figure 2:
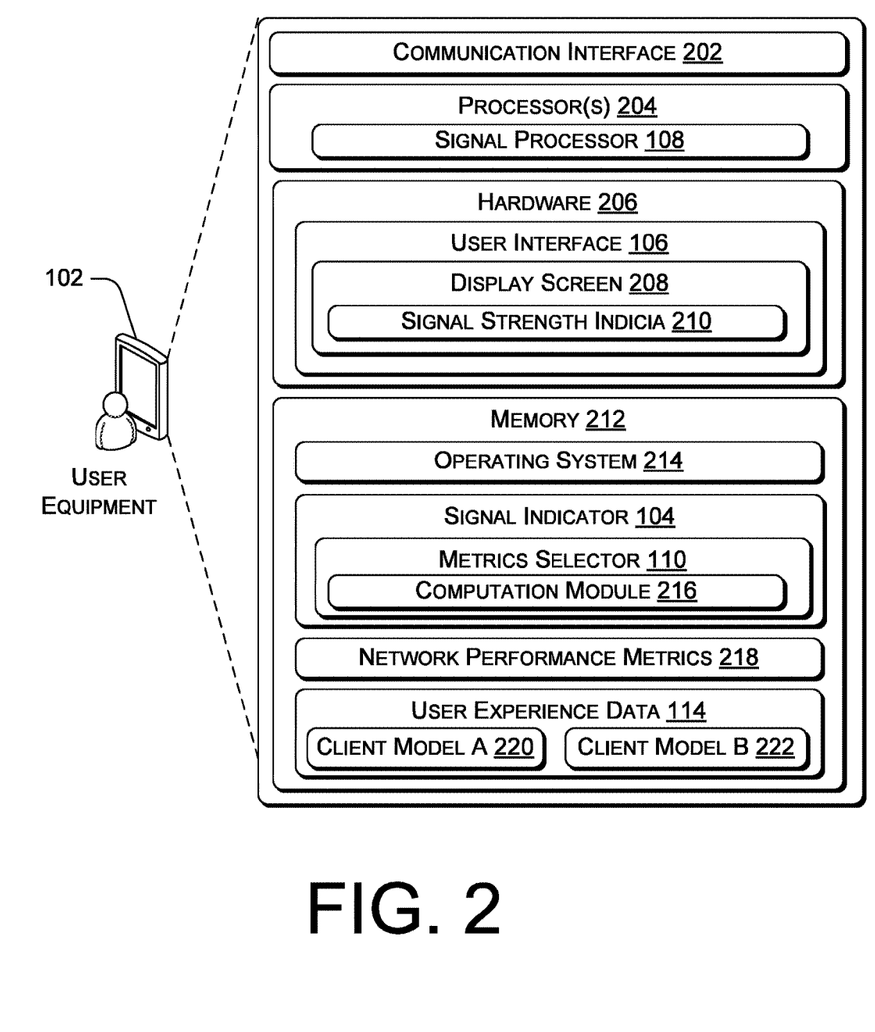
FIG. 2 is a block diagram showing various components of an illustrative computing device that can provide one or more experience based signal strength indicia.

FIG. 2 is a block diagram showing various components of an illustrative computing device, wherein the computing device can comprise a user equipment 102. It is noted that the user equipment 102 as described herein can operate with more or fewer of the components shown herein. Additionally, the user equipment 102 as shown herein or portions thereof can serve as a representation of one or more user equipment 102 of the present system.

The user equipment 102 may include a communication interface 202, one or more processors 204, hardware 206, and memory 212. The communication interface 202 may include wireless and/or wired communication components that enable the user equipment 102 to transmit data to and receive data from other networked devices. In at least one example, the one or more processors 204 may be a central processing unit(s) (CPU), graphics processing unit(s) (GPU), both a CPU and GPU, or any other sort of processing unit(s). Additionally, the processor(s) 204 can include a signal processor 108 (e.g., a digital signal processor). Each of the one or more processors 204 may have numerous arithmetic logic units (ALUs) that perform arithmetic and logical operations as well as one or more control units (CUs) that extract instructions and stored content from processor cache memory, and then executes these instructions by calling on the ALUs, as necessary during program execution.

The one or more processors 204 may also be responsible for executing all computer applications stored in the memory, which can be associated with common types of volatile (RAM) and/or nonvolatile (ROM) memory. The hardware 206 may include at least one user interface 106, data communication, or data storage hardware. For example, the user interfaces 106 may include a data output device (e.g., a display screen 208, audio speakers), and one or more data input devices. The data input devices may include but are not limited to, combinations of one or more of keypads, keyboards, mouse devices, touch screens that accept gestures, microphones, voice or speech recognition devices, and any other suitable devices.

The memory 212 may be implemented using computer-readable media, such as computer storage media. Computer-readable media includes, at least, two types of computer-readable media, namely computer storage media and communications media. Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, DVD, high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The processors 204 and the memory 212 of the user equipment 102 may implement an operating system 214 and a signal indicator 104. The operating system 214 may include components that enable the user equipment 102 to receive and transmit data via various interfaces (e.g., user controls, communication interface, and/or memory input/output devices), as well as process data using the processors 204 to generate output. The operating system 214 may include a presentation component that presents the output (e.g., display the data on an electronic display, store the data in memory, transmit the data to another electronic device, etc.). Additionally, the operating system 214 may include other components that perform various additional functions generally associated with an operating system.

The signal indicator 104 can be operatively connected to the user interface 106 and the signal processor 108. The user interface 106 comprises a display screen 208 that can display or illuminate one or more signal strength indicia 210. The signal strength indicia 210 can comprise one or more sets of signal bars, dots, or other symbols. Each set of the signal bars of the signal strength indicia 210 can represent the signal strength of a specific user experience. For instance, a first set of signal bars can be used for voice experience, a second set of signal bars can be used for data experience, and a third set of signal bars can be used for video experience. Additionally, or alternatively, the signal strength indicia 210 can comprise a single set of signal bars that can correspond to a consolidated signal strength values for a voice experience, a data experience, and a video experience. In this regard, the signal strength values for the voice experience, the data experience, and the video experience can be averaged or calculated into a single integer value in any number of appropriate ways in order to represent an overall user experience. In various embodiments, the signal strength indicia 210 can change or update in real-time or in near real-time based at least partially on the real-time or near real-time user experience. For instance, the signal strength indicia 210 can display more or fewer signal bars during a phone call to represent the most up-to-date signal strength value for a user's voice experience.

The signal indicator 104 comprises a metrics selector 110. The metrics selector 110 comprises a computation module 216 for calculating the signal strength values for various user experience types. The metrics selector 110 is configured to select one or more network performance metrics 218 corresponding to the user experience data 114 associated with one or more user experience type. For instance, the metrics selector 110 can select one or more network performance metrics 218 such as latency and jitter correlating to user experience data 114 (e.g., such as how fast pages load and how fast transactions complete) for data experience because increased latency and jitter can result in poor user data experience. Upon selecting a user experience type (e.g., voice experience, video experience, data experience, etc.), the user experience data 114 and network performance metrics 218 (e.g., latency and packet loss) corresponding to the selected user experience type are used to calculate, via the computational module 216, the signal strength value of the user experience type.

The user experience data 114 can comprise one or more client models 220, 222 based on historical usage of voice, data, or video by a user over a predetermined time interval. The metrics selector 110 can use the one or more client models 220, 222 in real-time to select one or more network performance metrics 218 that represent the current user experience. Additionally, the computation module 216 can preemptively calculate changes in signal strength values for different user experience based on the client models 220, 222. For example, the client models 220, 222 can be used to identify trends or patterns for usage. In this regard, the client models 220, 222 can help determine when and where a user most often utilizes data services. Thus, the computation module 216 can be configured to calculate a predicted signal strength value for data experience using selected network performance and based on an inference that the user is about to use data.

The predicted signal strength value may be represented by the signal strength indicia 210 in various ways. For instance, the predicted signal strength can be reflected as a change in color of the current signal bars for data. More specifically, the signal bars can be displayed in red if the signal strength value is predicted to deteriorate. Conversely, the signal bars can be displayed in green if the signal strength value is predicted to improve. In another example, the predicted signal strength can be reflected as a symbol. More specifically, a downward pointing arrow can be displayed adjacent to the signal bars if the signal strength value is predicted to deteriorate. Conversely, an upward pointing arrow can be displayed adjacent to the signal bars if the signal strength value is predicted to improve.

In various embodiments, the memory 212 can also include network performance metrics 218 and one or more sets of user experience data 114. In various embodiments, the signal indicator 104 can also interface with an application programming interface (API) for providing access to user experience data 114 or one or more network performance metrics.

Example Processes

Figure 3:
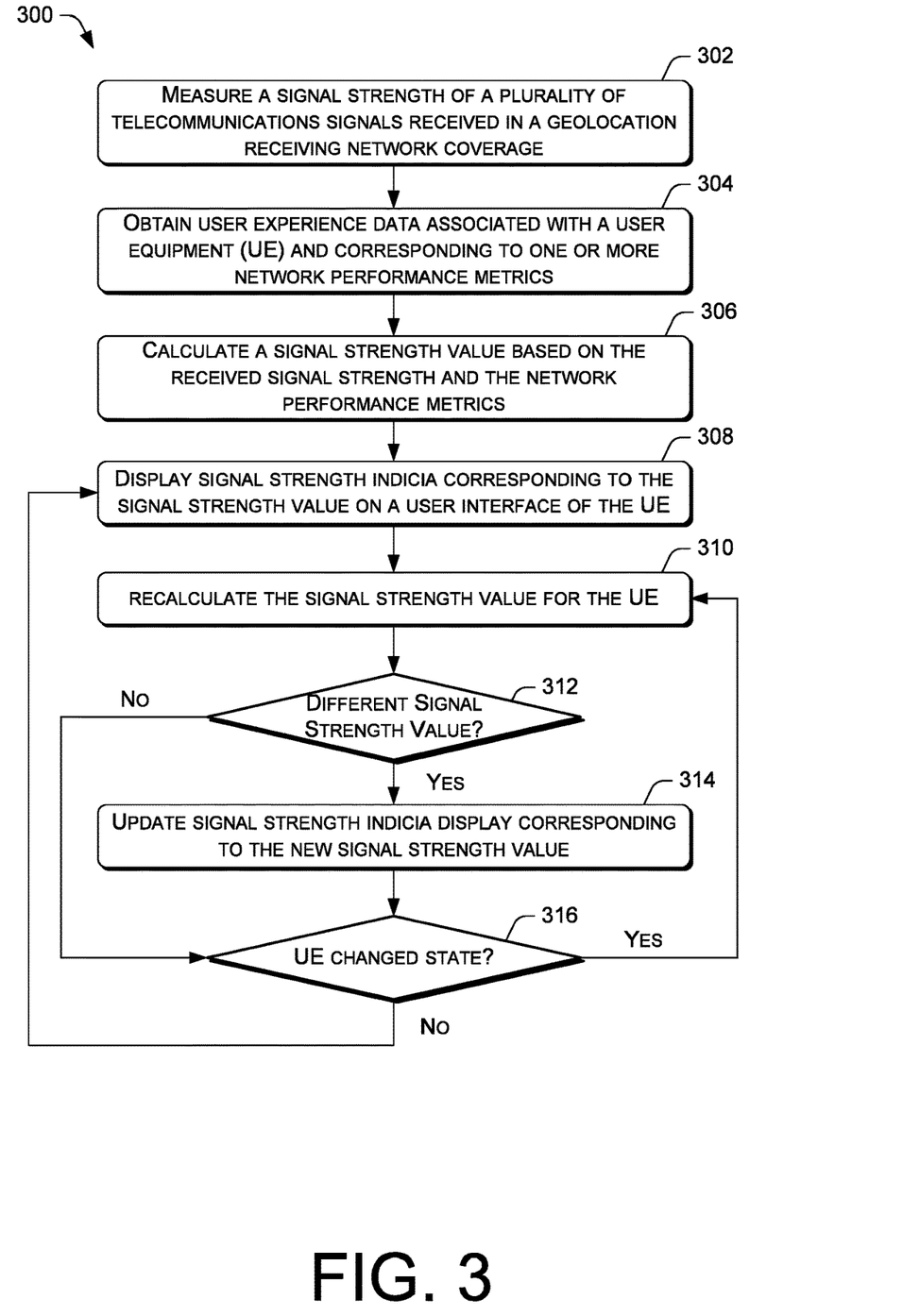
FIG. 3 is a flow diagram of an example process for determining and displaying signal strength indicia based on standardized measurements and user experience data.
Figure 4:
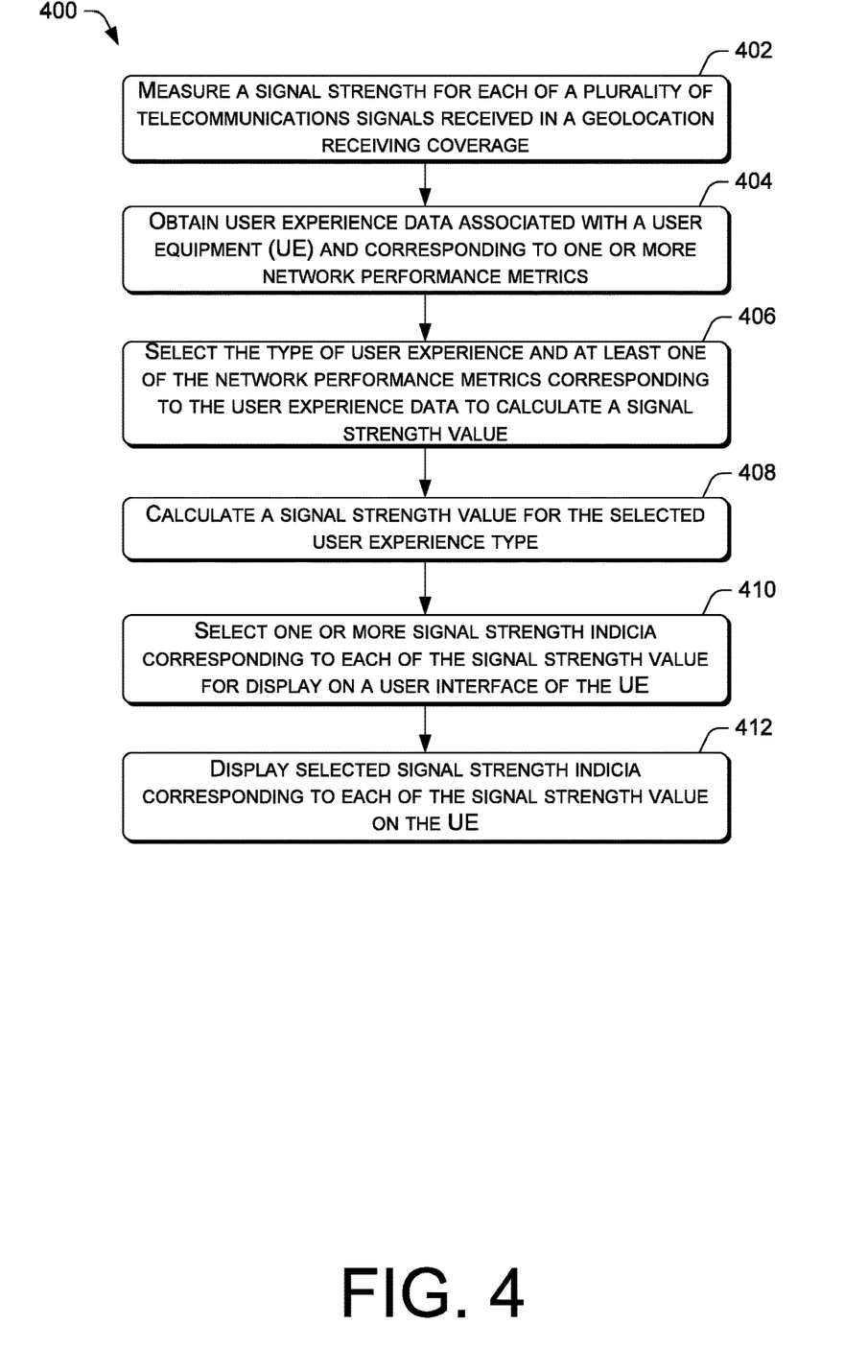
FIG. 4 is a flow diagram of an example process for determining and displaying one or more selected signal strength indicia based on standardized measurements and selected user experience.

FIGS. 3 and 4 present illustrative processes 300-400 for providing enhanced signal strength indicia on user equipment. The processes 300-400 are illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 300-400 are described with reference to the system 100 of FIG. 1.

FIG. 3 is a flow diagram of an example process 300 for determining and displaying signal strength indicia based on standardized measurements and user experience data, from the perspective of one or more user equipment in communication with a network. At block 302, a user equipment can measure, for example, using a signal processor, signal strength of a plurality of telecommunications signals received in a geolocation receiving coverage. At block 304, the user equipment obtains user experience data in real time or in near-real time, wherein the user experience data corresponds to one or more network performance metrics and a user experience type. At lock 306, the user equipment, via a computation module of a signal indicator, calculates a signal strength value based on the received signal strength and the network performance metrics.

It is noted that the signal strength value can be calculated in any number of appropriate ways. For example, the received signal strength and the network performance metrics can be averaged. In another example, the received signal strength and the network performance metrics can be represented as functions and relations. At block 308, the user equipment displays, on a user interface, signal strength indicia corresponding to the signal strength value on the user equipment. In various embodiments, the signal indicator can provide one or more ranges of the signal strength values that correspond to the signal strength indicia. For instance, the signal strength indicia can display one signal bar if the calculated signal strength value falls within a first range of the signal strength values and display two signal bars if the calculated signal strength value falls within a second range of the signal strength values.

At block 310, the user equipment can periodically recalculate the signal strength value for the user equipment. At decision block 312, the user equipment can determine if the signal strength of the telecommunications signals has changed. For example, the signal strength can change if the user equipment has changed its location. If the signal strength has changed ("yes" response from the decision block 312), the user equipment can display the updated signal strength indicia, wherein the updated signal strength indicia corresponds to the new signal strength value, as indicated in block 314. At decision block 316, the user equipment can change its state. For example, the user equipment can switch from an active mode to an idle mode. If the state of the user equipment has changed ("yes" response from the decision block 316), the server can recalculate the signal strength value, as indicated in block 310.

FIG. 4 is a flow diagram of an example process 400 for determining and displaying one or more selected signal strength indicia based on standardized measurements and selected network performance metrics and user experience data. At block 402, a user equipment measures a signal strength for each of a plurality of telecommunications signals received in a geolocation receiving network coverage. At block 404, the user equipment obtains user experience data corresponding to one or more network performance metrics in real time or in near-real time. The obtained user experience data can be transmitted to a server and/or a data store. In this regard, the user equipment can transmit the user experience data on a scheduled basis or upon receiving a request for the user experience data from the server. The server can implement a data retrieving scheme in order to manage data retrieval, management, and storage, depending upon embodiments.

At block 406, the user equipment can implement a metrics selector to select at least one of the network performance metrics based on the type of user experience (e.g., voice experience, video experience, data experience, etc.) to calculate a signal strength value. At block 408, the user equipment calculates a signal strength value for each of the user experience type using corresponding network performance metrics and user experience data. In this regard, the signal strength value for voice can be greater than the signal strength value for video. Thus, the signal strength value can differ depending on the user experience type. At block 410, the user equipment can select one or more signal strength indicia corresponding to each of the signal strength value for display on the user equipment. At block 412, the user equipment can display selected signal strength indicia corresponding to each of the signal strength value on the user equipment. Thus, the user equipment can display signal strength indicia for certain user experience types.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media storing computer-executable instructions that upon execution cause one or more processors to perform acts comprising:
measuring a signal strength of a telecommunications signal received at a user equipment in a target geolocation in which a network coverage is to be provided;
obtaining user experience data for each of a plurality of user experience types at the user equipment, the user experience data corresponding to one or more network performance metrics and each user experience type of the plurality of user experience types corresponding to a different form of communication;
calculating a signal strength value based at least partially on the signal strength and the one or more network performance metrics corresponding to the user experience data for individual user experience types of the plurality of user experience types;
calculating, based on usage patterns for the individual user experience types, a predicted improvement or deterioration in the signal strength value calculated for the individual user experience types of the plurality of user experience types; and
displaying a plurality of signal strength indicia, individual signal strength indicia of the plurality of signal strength indicia corresponding to the signal strength value calculated for an individual user experience type included in the plurality of user experience types, wherein the plurality of signal strength indicia are further visibly indicative of the predicted improvement or deterioration of the signal strength value for the individual user experience types based on the predicted improvement or deterioration in the signal strength value calculated corresponding to the individual user experience types.

2. The one or more non-transitory computer-readable media of claim 1, wherein the plurality of user experience types comprises a first user experience type and a second user experience type;
calculating a first signal strength value for the first user experience type based at least partially on the user experience data corresponding to the first user experience type; and
calculating a second signal strength value for the second user experience type based at least partially on the user experience data corresponding to the second user experience type.

3. The one or more non-transitory computer-readable media of claim 2, wherein the acts further comprise:
simultaneously displaying a first signal strength indicium corresponding to the first signal strength value and a second signal strength indicium corresponding to the second signal strength value.

4. The one or more non-transitory computer-readable media of claim 2, wherein the acts further comprise:
selecting a first signal strength indicium corresponding to the first signal strength value for display.

5. The one or more non-transitory computer-readable media of claim 1, wherein the plurality of user experience types comprises a voice experience, a data experience, and a video experience.

6. The one or more non-transitory computer-readable media of claim 1, wherein the acts further comprise:
selecting at least one of the one or more network performance metrics; and
calculating a second signal strength value based at least partially on the signal strength and the one or more network performance metrics selected.

7. The one or more non-transitory computer-readable media of claim 1, wherein the one or more network performance metrics comprises packet latency, throughput, packet loss, and availability.

8. The one or more non-transitory computer-readable media of claim 1, wherein the acts further comprise:
periodically recalculating the signal strength value based at least partially on the signal strength and the one or more network performance metrics; and
updating the signal strength indicia displayed on the user equipment.

9. The one or more non-transitory computer-readable media of claim 1, wherein the signal strength indicia comprise at least one set of signal bars or dots.

10. The one or more non-transitory computer-readable media of claim 1, wherein the particular form of communication comprises at least one of voice, video, or data communication.

11. The one or more non-transitory computer-readable media of claim 1, wherein the plurality of signal strength indicia are visibly indicative of the predicted improvement or deterioration of the signal strength value for respective individual user experience types by virtue of being represented as an arrow pointing up or down.

12. The one or more non-transitory computer-readable media of claim 1, wherein the plurality of signal strength indicia are visibly indicative of the predicted improvement or deterioration of the signal strength value for respective individual user experience types by virtue of being represented in different colors.

13. A computer-implemented method, comprising:
measuring a signal strength of a telecommunications signal received in a target geolocation in which a network coverage is to be provided;
collecting user experience data for each of a plurality of user experience types, the user experience data corresponding to one or more network performance metrics, each user experience type of the plurality of user experience types corresponding to a different form of communication;
calculating a signal strength value based at least partially on the signal strength and the one or more network performance metrics corresponding to the user experience data for individual user experience types of the plurality of user experience types;
calculating, based on usage patterns for the individual user experience types, a predicted improvement or deterioration in the signal strength value calculated for the individual user experience types of the plurality of user experience types; and
displaying a plurality of signal strength indicia, individual signal strength indicia of the plurality of signal strength indicia corresponding to the signal strength value for an individual user experience type of the plurality of user experience types, wherein the plurality of signal strength indicia are further visibly indicative of the predicted improvement or deterioration of the signal strength value for the individual user experience types based on the predicted improvement or deterioration in the signal strength calculated corresponding to the individual user experience types.

14. The computer-implemented method of claim 13, further comprising the steps of:
- switching from an idle mode to an active mode;
- collecting second user experience data corresponding to the one or more network performance metrics;
- calculating a second signal strength value based at least partially on the signal strength and the second user experience data; and
- displaying a second signal strength indicium corresponding to the second signal strength value.

15. The computer-implemented method of claim 13, wherein the user experience data is collected in real-time or in near real-time.

16. The computer-implemented method of claim 13, further comprising the steps of:
- selecting at least one of the one or more network performance metrics.

17. The computer-implemented method of claim 13, wherein the user experience data correlates with an account that is associated with a plurality of user equipment and a plurality of users.

18. A system, comprising:
- one or more non-transitory storage mediums configured to provide stored code segments, the one or more non-transitory storage mediums coupled to one or more processors, each configured to execute the code segments and causing the one or more processors to:
  - measure a signal strength of a telecommunications signal received at a user equipment in a target geolocation in which a network coverage is to be provided;
  - obtain user experience data for each of a plurality of user experience types from the user equipment, the user experience data corresponding to one or more network performance metrics, each user experience type of the plurality of user experience types corresponding to a different form of communication;
  - calculate a signal strength value based at least partially on the signal strength and the one or more network performance metrics corresponding to the user experience data for individual user experience types of the plurality of user experience types;
  - calculate, based on usage patterns for the individual user experience types, a predicted improvement or deterioration in the signal strength value calculated for the individual user experience types of the plurality of user experience types; and
  - display a plurality of signal strength indicia, individual signal strength indicia of the plurality of signal strength indicia corresponding to the signal strength value calculated for an individual user experience type included in the plurality of user experience types, wherein the plurality of signal strength indicia are further visibly indicative of the predicted improvement or deterioration of the signal strength value for the individual user experience types based on the predicted improvement or deterioration in the signal strength value calculated corresponding to the individual user experience types.

19. The system of claim 18, wherein the one or more processors are further configured to:
- change a state of the user equipment;
- measure the signal strength of the telecommunication signal received at the user equipment in a second state in the target geolocation; and
- obtain second user experience data from the user equipment in the second state, the second user experience data corresponding to the one or more network performance metrics.

20. The system of claim 19, wherein the state of the user equipment is changed from a first state that comprises an active mode to the second state that comprises an idle mode.

* * * * *